Patented Aug. 11, 1925.

1,549,063

UNITED STATES PATENT OFFICE.

NIELS C. CHRISTENSEN, OF SALT LAKE CITY, UTAH.

PROCESS OF TREATING SULPHIDE ORES OF LEAD AND ZINC.

No Drawing.   Application filed December 26, 1923. Serial No. 682,833.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Sulphide Ores of Lead and Zinc, of which the following is a specification.

This process relates to the treatment of sulphide ores of zinc and lead. It may be used for the treatment of ores containing only zinc sulphide but is particularly applicable to the treatment of mixed lead-zinc sulphide ores; i. e., the so-called complex or mixed sulphide ores of lead and zinc. It is also particularly applicable to the treatment of products secured by the concentration of such ores by ordinary mechanical concentration and flotation.

It is the object of the process to extract the lead and zinc from such ores and concentrates in separate products, and also to secure the silver and gold in products distinct from the lead and zinc products.

In general, the process consists of mixing the ore or concentrate with hot concentrated hydrochloric acid in such proportion as to convert the lead, zinc and silver to chlorides. In order to do this it is necessary that a proportion of acid to ore sufficient to dissolve the greater part of the chlorides formed be used, as otherwise some of the sulphides are not altered. A proportion of acid considerably in excess of the amount necessary to react with lead and zinc sulphides must therefore be used.

It is necessary to remove this excess of acid before the lead and zinc can be efficiently separated from the residue of ore and from each other. After a sufficient time of treatment, the greater part of this excess acid is therefore removed by evaporating the mixture practically to dryness. It is preferable that the evaporation be not carried too far, as this results in the decomposition of some of the zinc chloride.

The thickened pulp from the foregoing treatment is then leached with water (either hot or cold) to remove the zinc chloride. A small amount of lead chloride is also dissolved, and in some cases a small amount of iron and other minor impurities are also dissolved. These are precipitated from the zinc chloride solution by the addition of artificial zinc sulphide, produced in the process as later described.

The residue from the foregoing treatment contains practically all the lead and most of the silver as chlorides, together with the pyrite and insoluble siliceous gangue, practically always present in such ores. This residue is leached with a hot concentrated chloride brine (NaCl or $CaCl_2$ or a mixture of the two, or any other suitable chlorides) preferably containing a very small amount of acid (either HCl or $H_2SO_4$, preferably the former). The hot brine dissolves all the lead and silver chlorides, leaving the pyrite (also chalcopyrite and complex arsenical silver minerals) practically untouched, together with the siliceous gangue material. Any chalcocite or artificial copper sulphide from the first and second treatment may be dissolved by the brine if the proportion of acid in the brine is slightly increased.

From this hot pregnant brine the silver is precipitated with metallic lead, and the greater proportion of the lead is then precipitated as a chloride by cooling the brine solution.

If copper is present in solution, the silver may be precipitated with metallic copper, the copper with metallic lead, and the lead by cooling. The residual lead in the cool solution may then be precipitated by the addition of calcium sulph-hydrate, $Ca(SH)_2$. The cold brine is then reheated and used over again.

The residue of ore left from the foregoing treatments contains the pyrite and chalcopyrite, etc., in which a portion of the silver is locked up, and also the gold in the ore. This product, if low in silica, may be sent direct to a smelter, but if high in silica is preferably concentrated by flotation to remove the silica. The pyrite (or chalcopyrite and pyrite) concentrate carrying the gold and residual silver may then be shipped to a smelter for treatment.

The zinc chloride solution from the first leaching operation may be evaporated to any desired concentration or the evaporation may be carried to the point of dryness giving anhydrous $ZnCl_2$. The method of securing the anhydrous chloride will not be here described as it forms the subject of a separate patent application.

The lead chloride secured from the second leaching operation may be smelted with lime and carbon or may be electrolyzed to secure the lead as metal therefrom. The preferred use for the lead chloride is for the manufacture of anhydrous $AlCl_3$ or $ZnCl_2$, as described in my patent applications No. 644,047 and No. 644,048.

If desired, the process may be carried out as follows instead of in the manner previously described, the results being substantially the same. The ground ore is agitated with an excess of hot concentrated HCl as previously described. The hot acid solution is then separated from the ore and this solution (preferably mixed with the solution used in washing the lead and zinc chloride out of the residue of ore) evaporated to remove the excess HCl. A large part of the lead chloride in solution is precipitated in this operation. The evaporated mixture is then mixed with sufficient water to dissolve all the zinc chloride, leaving the greater part of the lead chloride undissolved. From this zinc chloride solution, the lead, and iron and other minor impurities are precipitated with ZnS as previously mentioned. If desired, the pregnant solution may be cooled to precipitate as much of the PbCl as possible before evaporation to drive off the excess HCl.

The process may also be carried out by treating the ore with an excess of hot concentrated HCl, as described. This mixture may then be cooled so as to precipitate most of the $PbCl_2$ in the undissolved residue of ore. The residue of ore is then washed with water and this washed solution added to the cold acid zinc solution, which is then evaporated and purified as previously described. The residue of ore and lead chloride are treated with brine for the recovery of lead and silver as first described.

As will be seen, the process may be carried out in a number of different ways, the preferred method depending upon the character of the material treated.

The details of the various steps of the process may be carried out in a number of ways in different kinds of apparatus. My preferred methods are described in the following, though I do not desire to be limited to the methods described.

To secure the best results, the ore should be very finely ground, as the time of treatment is very much less with finer ore than with coarse ore and the extraction, particularly of the zinc, is much more complete.

Sufficient hot acid should be used to dissolve the chlorides formed as otherwise the time of treatment is increased and the extraction diminished.

Before being treated by the process proper with many ores and products it is advisable to give the material a thorough treatment with dilute HCl or $H_2SO_4$ (preferably hot) to dissolve out all the readily soluble part of the ore such as the lime and oxidized iron and manganese compounds or, in some ores, to dissolve the iron and manganese out of the complex mixed sulphide mineral consisting of a mixture of iron, manganese, zinc and lead sulphide which forms a part of some complex ores. This preliminary treatment will obviate much of the difficulty of cleaning the zinc chloride solution secured in the process.

The ore should be agitated with the hot HCl solution in order to allow free escape of the $H_2S$ generated. This agitation should be carried out in a closed mechanical agitator so as to avoid dilution of the pulp with steam or the gases with air.

The evaporation of the acid solution, either mixed with the ore or separate as described, to drive off practically all the excess acid may be carried out in any suitable apparatus but the evaporation should preferably not be carried far enough to cause the formation of much zinc oxychloride.

The zinc chloride should preferably be dissolved out of the evaporated mixture with cold water in order to avoid dissolving any considerable quantity of $PbCl_2$. This washing operation should preferably be carried out in a counter-current washing system, such as is commonly used in the cyanide slime process. The operation may also be carried out with any suitable filtering device.

The acid in the zinc chloride solution is preferably neutralized with artificial ZnS and then purified by treatment with more ZnS which precipitates the lead, iron and other impurities from the neutral zinc chloride solution.

The ZnS for this purpose may be made by treating some of the $ZnCl_2$ solution with calcium sulph-hydrate. The latter may be made by bringing the $H_2S$ from the dissolving operation into contact with calcium hydroxide, preferably suspended in solution.

The purified $ZnCl_2$ solution may be marketed as such or may be avaporated to dryness to secure an hydrous $ZnCl_2$.

The residue of ore is leached with a hot concentrated brine composed of NaCl or $CaCl_2$ which dissolves the lead and silver chloride, and any chalcocite or copper sulphide present in the residue. The chloride solution should perferably be slightly acid. The silver and copper are precipitated from the hot brine as previously described and the lead chloride precipitated by cooling. The lead remaining in the cold chloride solution may be recovered as a sulphide by precipitation with calcium sulph-hydrate, the latter being made from the $H_2S$ generated in the process as previously described.

By this process it is possible to treat complex lead zinc-sulphide ores and make a practically complete recovery of the lead and zinc in separate relatively pure chlorides, and to recover the greater part of the silver as a high grade precipitate, and also to recover the residual silver and copper and the gold in a clean pyrite, also chalcopyrite, etc. concentrate. A practically complete recovery of all the metals in separate clean marketable products may thus be made.

Having described my process, what I claim and desire to patent is—

1. The process of treating ores containing zinc sulphide which consists in mixing said ores and the like with sufficient hot concentrated hydrochloric acid to convert the zinc to a chloride and heating said mixture and driving off the excess acid and dissolving the zinc chloride thus formed out of the insoluble residue of ore with water to form a zinc chloride solution.

2. The process of treating ores containing zinc sulphide which consists in mixing said ores and the like with an excess of concentrated hydrochloric acid and heating said mixture and driving off the excess acid and thereby converting the zinc to a chloride, and dissolving said zinc chloride away from the insoluble residue of ore with water to form a zinc chloride solution.

3. The process of treating ores containing zinc sulphide which consists in mixing said ores and the like with sufficient hot concentrated hydrochloric acid to convert the zinc to a chloride and heating the acid zinc chloride solution thus formed to drive off the excess acid and dissolving the zinc chloride thus formed in water to form a zinc chloride solution.

4. The process of treating ores containing zinc sulphide which consists in mixing said ores and the like with an excess of concentrated hydrochloric acid and heating said mixture and thereby converting the zinc to a chloride and heating the acid zinc chloride solution thus formed and driving off the excess acid and dissolving the zinc chloride thus formed in water to form a zinc chloride solution.

5. The process of treating zinc-lead sulphide ores which consists in mixing said ores and the like with sufficient hot concentrated hydrochloric acid to convert the zinc and lead to chlorides and heating said mixture and driving off the excess acid, and dissolving the zinc chloride thus formed out of the residue of ore with water to form a zinc chloride solution, and thereafter dissolving the lead chloride thus formed out of the residue of ore with a concentrated brine.

6. The process of treating zinc lead sulphide ores which consists in mixing said ores and the like with an excess of concentrated hydrochloric acid and heating said mixture and driving off the excess hydrochloric acid and thereby converting the zinc and lead to chlorides and dissolving the zinc chloride thus formed out of the residue of ore with water to form a zinc chloride solution, and thereafter dissolving the lead chloride out of the residue of ore with a concentrated brine.

7. The process of treating zinc-lead sulphide ore which consists in mixing said ores and the like with sufficient hot concentrated hydrochloric acid and to convert the zinc and lead to chlorides and heating said mixture and driving off the excess acid, and dissolving the zinc chloride thus formed out of the residue of ore with water to form a zinc chloride solution and thereafter dissolving the lead chloride thus formed with hot concentrated brine and recovering the lead chloride from said brine by cooling said brine and precipitating lead chloride therefrom.

8. The process of treating zinc lead sulphide ores which consists in mixing said ores and the like with an excess of concentrated hydrochloric acid and heating said mixture and driving off the excess hydrochloric acid and thereby converting zinc and lead and silver in said ores to chlorides, and dissolving the zinc chloride thus formed out of the residue of treated ore with water to form a zinc chloride solution and thereafter dissolving the lead and silver chlorides thus formed out of the residue of treated ore with a concentrated brine and precipitating the silver out of said brine with metallic lead.

9. The process of treating zinc-lead sulphide ores which consist in mixing said ores with an excess of concentrated hydrochloric acid and heating said mixture and driving off the excess hydrochloric acid and thereby converting zinc, lead and silver in said ores to chlorides, and dissolving the zinc chloride thus formed out of the residue of treated ore with water to form a zinc chloride solution and thereafter dissolving the lead and silver chlorides thus formed out of the residue of treated ore with a hot concentrated brine and precipitating the silver out of said brine with metallic lead and thereafter recovering lead chloride from said brine by cooling said brine and precipitating lead chloride therefrom.

10. The process of treating zinc-lead sulphide ores which consists in mixing said ores and the like with an excess of concentrated hydrochloric acid and heating said mixture and driving off the excess acid and thereby converting zinc, lead, silver and copper in said ore to chlorides and dissolving the zinc chloride thus formed out of the residue of treated ore with water to form a zinc chloride solution and thereafter dissolving the lead, silver and copper chloride thus formed out of the residue of treated ore with a hot concentrated brine and precipitating silver out of said brine with metallic copper and copper out of said brine with metallic lead and thereafter recovering lead chloride from said brine by cooling said brine and precipitating lead chloride therefrom.

11. The process of treating ores containing zinc sulphide which consists in mixing said ores and the like with sufficient hot concentrated hydrochloric acid and to convert the zinc to a chloride and heating said mixture and driving off the excess hydrochloric acid and dissolving the zinc chloride thus formed out of the insoluble residue of treated ore in water to form a zinc chloride solution, and precipitating metals other than the zinc out of said solution by adding artificial zinc sulphide to the said solution.

12. The process of treating ores containing zinc sulphide which consists in mixing said ores and the like with an excess of concentrated hydrochloric acid and heating said mixture and driving off the excess acid and thereby converting the zinc to a chloride and dissolving said zinc chloride away from the insoluble residue of treated ore with water to form a zinc chloride solution and precipitating metals other than zinc from said solution by adding artificial zinc sulphide to said solution.

13. The process of treating ores containing zinc sulphide which consists in mixing said ores and the like with sufficient hot concentrated hydrochloric acid to convert the zinc to a chloride and heating said mixture and driving off the excess acid and dissolving the zinc chloride thus formed out of the insoluble residue of treated ore in water to form a zinc chloride solution, and absorbing the $H_2S$ formed from said zinc sulphide by said treatment with acid with lime to form calcium sulph-hydrate, and precipitating the zinc from a portion of said zinc chloride solution as a sulphide with said calcium sulph-hydrate, and using said artificial zinc sulphide to precipitate metals other than zinc from the residue of said zinc chloride solution.

14. The process of treating ores containing zinc sulphide which consists in mixing said ores and the like with an excess of concentrated hydrochloric acid and heating said mixture and driving off the excess acid and thereby converting the zinc to a chloride and dissolving said zinc chloride away from the insoluble residue of ore with water to form a zinc chloride solution, and absorbing the $H_2S$ formed from said zinc sulphide by said treatment with acid with lime to form calcium sulph-hydrate and precipitating the zinc from a portion of said zinc chloride solution as a sulphide with said calcium sulph-hydrate and using said artificial zinc sulphide to precipitate metals other than zinc from the residue of said zinc chloride solution.

NIELS C. CHRISTENSEN.